United States Patent
Swan

[15] 3,703,786
[45] Nov. 28, 1972

[54] GRASS SEED MAT

[72] Inventor: Donald M. Swan, 28757 Chatham Road, Grosse Ile, Mich. 48138

[22] Filed: June 23, 1971

[21] Appl. No.: 156,080

[52] U.S. Cl. .................................47/56, 47/DIG. 7
[51] Int. Cl. ..............................................A01g 31/00
[58] Field of Search............47/DIG. 7, 9, 56, 37, 1.2, 47/1

[56] References Cited

UNITED STATES PATENTS

| | | | |
|---|---|---|---|
| 2,988,441 | 6/1961 | Pruitt | 47/56 UX |
| 3,080,681 | 3/1963 | Merrill et al. | 47/56 |
| 3,154,884 | 11/1964 | Amar et al. | 47/56 X |
| 3,160,986 | 12/1964 | Watson et al. | 47/56 |
| 3,257,754 | 6/1966 | Ohsol | 47/56 |
| 3,608,238 | 9/1971 | Reuter | 47/1.2 |

*Primary Examiner*—Robert E. Bagwill
*Attorney*—William R. Day

[57] ABSTRACT

A grass seed mat for the germination and growing of grass seed when placed in contact with a soil surface consists of a sheet of polyurethane foam material with grass seeds attached to one side by means of a water-soluble glue or adhesive. In order for the mat to provide the dual functions of providing adequate moisture retention (mulching effect) and penetration of the grass shoots through the mat, achieving an optimum 90–100 percent seed germination and growth, the pore or cell size of the foam material must be in the critical range of 35 to 40 pores per lineal inch and a thickness of between 4/64 to 6/64 of an inch. Preferably, the polyurethane foam material is a reticulated, fully open pore-type wherein the pores are of substantially uniform size (as compared one to the other), with a total of approximately 97 per cent void space and a density of 1.7 to 2.3 pounds per cubic foot. Foam material having pore sizes or thicknesses above or below this stated critical range will not produce the desired 90–100 percent germination and shoot penetration because of either inability to provide proper moisture retention, inability of the grass shoots to penetrate the mat or lifting of the mat from contact with the soil surface.

3 Claims, No Drawings

GRASS SEED MAT

DESCRIPTION OF THE PRIOR ART

The most pertinent prior art teaches the manufacture of a grass seed mat of various foamed, integral skin, polymers and co-polymers including polyurethane (Ohsol U.S. Pat. No. 3,257,754) in the form of a sheet having grass seed attached or adhered to one side. It is the stated objective of this prior art patent to provide a grass seed mat serving as a protective cover for the seed and to control the moisture to which the seed is exposed. The foamed sheet material with seed attached constitutes a convenient form for storing, shipping and ground application. The germination of the seed and growth of the grass shoots in such a seed mat, however, has met with but indifferent results. A foamed polyurethane sheet may be of a sufficient porosity and thickness to retain moisture in the vicinity of the seeds, but not of proper porosity and thickness to permit penetration of the grass shoots up through the sheet, and vice versa.

SUMMARY OF THE INVENTION

I have discovered that there is a critical balance between porosity (number of pores per lineal inch) and thickness in order to result in both functions of moisture retention or mulching in the vicinity of the grass seeds and shoot penetration of the polyurethane foam sheet, thus achieving optimum seed germination and growth. The polyurethane foam sheet employed in the seed mat of my invention is of the open cell or open pore type wherein the cells are interconnected, such as the polyester or polyether urethane foam as disclosed in U.S. Pat. No. 3,171,820, assigned to Scott Paper Company. Preferably, I utilize the reticulated form of foam disclosed in said patent and which is commercially available as "Scott Industrial Foam."

DEMONSTRATION OF THE CRITICAL RANGE OF PORE SIZE AND THICKNESS

I prepared specimens of reticulated "Scott Industrial Foam" about 6 inches square with rye grass seeds glued to one surface with "Elmer's Glue" sold by The Borden Co. which is a water-soluble casein glue. The density of this foam was in the range of 1.7 to 2.3 pounds per cubic foot, with a constant 97 percent of void space. These foam specimens possessed pore sizes ranging from 10 to 80 pores per lineal inch and thickness ranging from four sixty-fourths to twelve sixty-fourths of an inch. The specimens were placed seed side down on a soil surface composed of untreated, non-fertilized, natural Grosse Ile, Michigan, clay-based top soil, watered regularly and maintained at a uniform temperature of about 70° F.

After 2 weeks, the following table shows the results:

| Rating (S=Satisfactory) (U=Unsatisfactory) | Pore Size (No. per lineal inch) | Thickness of foam sheet (in inches) | Results |
| --- | --- | --- | --- |
| U | 10 | 12/64 | Sheet failed to retain moisture. Very poor germination. |
| U | 20 | 12/64 | Ditto above. |
| U | 30 | 4/64 | Ditto above. |
| U | 30 | 5/64 | Ditto above. |
| U | 30 | 6/64 | Fair moisture retention and mulching. Fair germination and medium penetration of shoots through sheet. |
| U | 30 | 8/64 | Ditto above. |
| S | 35 | 4/64 | Sheet retained moisture. Excellent mulching effect, optimum 90–100% germination and penetration of shoots through the sheet. |
| S | 35 | 5/64 | Ditto above. |
| S | 35 | 6/64 | Ditto above. |
| U | 35 | 8/64 | Good mulching effect, but shoots could not penetrate satisfactorily through the sheet, raising it from surface after initial germination. |
| S | 40 | 4/64 | Sheet retained moisture. Excellent mulching effect, optimum 90–100% germination and penetration of shoots through the sheet. |
| S | 40 | 5/64 | Ditto above. |
| S | 40 | 6/64 | Ditto above. |
| U | 40 | 8/64 | Good mulching effect, but shoots could not penetrate through the sheet, lifting it from the soil surface after initial germination. |
| U | 45 | 4/64 | Ditto above. |
| U | 45 | 4/64 | Ditto above. |
| U | 45 | 6/64 | Ditto above. |
| U | 60 | 4/64 | Water did not become absorbed in sheet. No germination. |
| U | 80 | 4/64 | Ditto above. |

From the foregoing, it will be seen that the required pore size and urethane foam thickness, in order to achieve the combined desired results of moisture retention-mulching and seed germination and foam sheet penetration, fall within the precise and critical range of 35 to 40 pores per lineal inch and four sixty-fourths to six sixty-fourths inch thickness. Outside this range, the desired results are not achieved.

I therefore claim as my invention:

1. A grass seed mat comprising grass seeds adhered to one side of a sheet of polyurethane foam material by water-soluble adhesive, said foam material having open, interconnecting cells of a size corresponding to 35 to 40 pores per lineal inch, a density of 1.7 to 2.3 pounds per cubic foot, and a thickness of four sixty-fourths to six sixty-fourths of an inch.

2. The grass seed mat as defined in claim 1 wherein the water-soluble adhesive is casein glue.

3. The grass seed mat as defined in claim 1 wherein the foam material is of the reticulated, polyester type with 97 per cent of void space.

* * * * *